US011148355B2

(12) United States Patent
Nakano

(10) Patent No.: US 11,148,355 B2
(45) Date of Patent: Oct. 19, 2021

(54) THREE-DIMENSIONAL SHAPED OBJECT PRODUCTION DEVICE AND THREE-DIMENSIONAL SHAPED OBJECT PRODUCTION METHOD

(71) Applicant: KAIJO CORPORATION, Tokyo (JP)

(72) Inventor: Akihisa Nakano, Tokyo (JP)

(73) Assignee: KAIJO CORPORATION, Tokyo (JP)

( * ) Notice: Subject to any disclaimer, the term of this patent is extended or adjusted under 35 U.S.C. 154(b) by 170 days.

(21) Appl. No.: 16/466,594

(22) PCT Filed: Sep. 12, 2017

(86) PCT No.: PCT/JP2017/032946
§ 371 (c)(1),
(2) Date: Jun. 4, 2019

(87) PCT Pub. No.: WO2019/053792
PCT Pub. Date: Mar. 21, 2019

(65) Prior Publication Data
US 2019/0315049 A1    Oct. 17, 2019

(51) Int. Cl.
*B29C 64/112* (2017.01)
*B29C 64/314* (2017.01)
(Continued)

(52) U.S. Cl.
CPC .......... *B29C 64/112* (2017.08); *B29C 64/209* (2017.08); *B29C 64/245* (2017.08);
(Continued)

(58) Field of Classification Search
CPC ... B29C 64/112; B29C 64/245; B29C 64/209; B29C 64/314; B33Y 10/00; B33Y 30/00; B33Y 40/00
See application file for complete search history.

(56) References Cited

U.S. PATENT DOCUMENTS

| 5,121,329 A | 6/1992 | Crump |
| 2005/0090091 A1 | 4/2005 | Ishikawa et al. |
| 2017/0266728 A1* | 9/2017 | Johnson ................ B33Y 10/00 |

FOREIGN PATENT DOCUMENTS

| JP | 2005135932 A | * | 5/2005 | ............. H01L 24/73 |
| WO | 88-02677 A2 | | 4/1988 | |

OTHER PUBLICATIONS

Patent Translate, "Description JP2005135932A", Mar. 10, 2021, EPO and Google. (Year: 2021).*

(Continued)

*Primary Examiner* — Joseph S Del Sole
*Assistant Examiner* — Margaret B Hayes
(74) *Attorney, Agent, or Firm* — Rankin, Hill & Clark LLP

(57) ABSTRACT

Provided are a three-dimensional shaped object production device and method capable of producing a predetermined three-dimensional shaped object by forming a ball at a leading end of a conductive wire through use of the conductive wire based on scanned data or designed data and aligning and stacking the balls. The three-dimensional shaped object production device includes: a plate (40), on which a three-dimensional shaped object is placeable; a ball forming section configured to form a ball (13) by applying high voltage between a leading end of a conductive wire (4) paid out from a leading end of a capillary (12) and a spark rod (19) and melting the leading end of the wire by discharge energy; a positioning device configured to position the plate and the ball forming section by moving the plate and the ball forming section relative to each other; and a bonding section configured to bond the ball formed at the leading end of the capillary to another ball (14) that has already been stacked on the plate, the forming of the ball by the ball forming section, the relative moving of the plate and the ball forming section by the positioning device, and the bonding of the ball (Continued)

formed at the leading end of the capillary to the another ball by the bonding section is repeated, to thereby produce a three-dimensional shaped object having a desired shape.

9 Claims, 8 Drawing Sheets

(51) Int. Cl.
| | | |
|---|---|---|
| *B29C 64/245* | (2017.01) | |
| *B29C 64/209* | (2017.01) | |
| *B33Y 10/00* | (2015.01) | |
| *B33Y 30/00* | (2015.01) | |
| *B33Y 40/00* | (2020.01) | |

(52) U.S. Cl.
CPC ............ *B29C 64/314* (2017.08); *B33Y 10/00* (2014.12); *B33Y 30/00* (2014.12); *B33Y 40/00* (2014.12)

(56) References Cited

OTHER PUBLICATIONS

International Search Report dated Nov. 7, 2017 filed in PCT/JP2017/032946.

\* cited by examiner

THREE-DIMENSIONAL SHAPED OBJECT PRODUCTION DEVICE AND THREE-DIMENSIONAL SHAPED OBJECT PRODUCTION METHOD

TECHNICAL FIELD

The present invention relates to a three-dimensional shaped object production device and a three-dimensional shaped object production method, and more particularly, to a three-dimensional shaped object production device and a three-dimensional shaped object production method, which are capable of producing a predetermined three-dimensional shaped object by forming a ball at a leading end of a conductive wire through use of the conductive wire, and by aligning and stacking the formed balls.

BACKGROUND ART

Hitherto, an object having a three-dimensional shape, for example, a solid shape, is produced by processing a material made of metal, or the like. As processing methods, for example, cutting work and press work are known, and various processing methods are used depending on the material to be processed, a shape to be obtained, and the like.

The cutting work is a processing method of cutting a metal material through use of cutting tools to process the material into a predetermined shape and dimension.

Meanwhile, the press work is a processing method of strongly pressing material, for example, a plate, against a die to shear and form the material into a required shape. In the press work, through preparation of a die, a large number of parts having the same shape can be produced.

However, the cutting work and the press work each require a large-sized apparatus. Further, a processing machine is operated by a dedicated operator, and hence the operation of the machine requires skill.

Thus, in Patent Literature 1, there is disclosed an apparatus for making three-dimensional physical objects of a predetermined shape by sequentially depositing a solidifying material into multiple layers on a base member. According to Patent Literature 1, the apparatus for making three-dimensional physical objects is realized by dispensing a material at a controlled rate from a dispensing head onto a substrate or base member into a predetermined pattern, with the material being dispensed in multiple layers which solidify and adhere to each other, to thereby build up the article. Further, the process is controlled so that the material in the preceding layer, and at least the material under the dispensing head, has solidified before the formation of the subsequent layer by the dispensing head.

As described above, in the apparatus for making three-dimensional physical objects disclosed in Patent Literature 1, an object of a predetermined shape is produced by sequentially depositing the solidifying material into multiple layers on the base member by the dispensing head.

In Patent Literature 2, there is disclosed a method involving using a directed laser beam to selectively sinter a powder to produce a part. According to Patent Literature 2, a laser beam is directed onto a deposited first layer of powder to selectively sinter a required portion, and then a second layer of powder is deposited onto the first layer. A laser beam is directed onto the deposited second layer of powder to selectively sinter a required portion in a similar manner, and at the same time, the sintered portion of powder is joined to the sintered portion of the first powder layer. Through repetition of this processing, a three-dimensional part can be produced by stacking layers one by one.

CITATION LIST

Patent Literature

[PTL 1] JP 8-2598 A
[PTL 2] JP 2620353 B2
[PTL 3] JP 4427298 B2

SUMMARY OF INVENTION

Technical Problem

Hitherto, a three-dimensional shaped object using a conductive material is produced by removing a material from a material block by the cutting work or the like. A three-dimensional shaped object is produced by cutting the material from the material block, and hence waste of material occurs. Moreover, it takes time to produce a three-dimensional shaped object.

Meanwhile, as in the apparatus for making three-dimensional physical objects disclosed in Patent Literature 1, in the method involving applying heat to a solidifying material on a base member to soften and melt the material and bonding the material to stack layers, it is required to use a material that can be softened and melted at relatively low temperature. The apparatus has therefore a problem in that the shape of an object is liable to change due to a change in temperature while the object is being produced.

Through use of a material that is softened and melted at high temperature, it is possible to reduce deformation of the shape of an object due to a change in temperature during the production of the object. However, it is not easy to handle the material that can be softened and melted at high temperature, and hence, in the apparatus for making three-dimensional physical objects, it is not practical to reduce the deformation of the shape of an object through use of the material that can be softened and melted at high temperature.

In such a method as disclosed in Patent Literature 2 of producing an object by applying a laser beam onto a powder material to melt and soften the material, the powder material to be used to produce the object is extremely expensive. In addition, a larger amount of the powder material s required than an amount of material to be used generally for the production of the object. Thus, a material cost of the object is increased. Moreover, a laser beam is applied onto the object by a laser device in units of several micrometers, and hence it is required to apply the laser beam for a long period of time. As a result, it takes time to produce a three-dimensional shaped object.

It is therefore an object of the present invention to provide a three-dimensional shaped object production device and a three-dimensional shaped object production method, which are capable of producing a predetermined three-dimensional shaped object by forming a ball at a leading end of a conductive wire through use of the conductive wire, and by aligning and stacking the formed balls, based on designed data obtained by designing a three-dimensional object by three-dimensional CAD or the like, or scanned data obtained by scanning a three-dimensional object by a three-dimensional scanner or the like.

Solution to Problem

In order to achieve the above-mentioned object, according to at least one embodiment of the present invention, there is provided a three-dimensional shaped object production device, which is configured to produce a three-dimensional shaped object, the three-dimensional shaped object production device including: a plate, on which the three-dimensional shaped object is placeable; ball forming means for forming a ball at a leading end of a conductive wire, which is inserted into a capillary and is paid out from a leading end of the capillary, by applying high voltage between the leading end of the conductive wire and a spark rod; positioning means for positioning the plate and the ball forming means by moving the plate and the ball forming means relative to each other; and bonding means for bonding the ball formed at the leading end of the capillary to at least one of the plate or another ball that has already been stacked on the plate, wherein the forming of the ball by the ball forming means, the positioning by the positioning means, and the bonding of the ball formed at the leading end of the capillary by the bonding means are repeated to stack the ball on the plate, to thereby produce a three-dimensional shaped object having a desired shape.

Further, in the three-dimensional shaped object production device according to at least one embodiment of the present invention, at least a surface of the plate is formed of a conductive material, and the ball formed at the leading end of the capillary is bonded by applying high voltage between the ball formed at the leading end of the capillary and the plate.

Further, in the three-dimensional shaped object production device according to at least one embodiment of the present invention, the ball formed at the leading end of the capillary is bonded by applying high voltage between the ball formed at the leading end of the capillary and the plate under a state in which a surface of the ball formed at the leading end of the capillary and a surface of the another ball that has already been stacked on the plate are brought close to each other so as to have a gap therebetween.

Further, in the three-dimensional shaped object production device according to at least one embodiment of the present invention, the ball formed at the leading end of the capillary is bonded by causing current to flow between the ball formed at the leading end of the capillary and the plate under a state in which a surface of the ball formed at the leading end of the capillary and a surface of the another ball that has already been stacked on the plate are brought into contact with each other.

Further, the three-dimensional shaped object production device according to at least one embodiment of the present invention, further including ultra sonic wave application means for applying ultrasonic vibration to the capillary, wherein the ball formed at the leading end of the capillary is bonded by the ultrasonic vibration applied by the ultrasonic wave application means Further, in the three-dimensional shaped object production device according to at least one embodiment of the present invention, the ultrasonic vibration is applied to the ball formed at the leading end of the capillary in a direction along a plane that crosses a line connecting a center of the ball formed at the leading end of the capillary and a center of the another ball that has already been stacked on the plate.

Further, in the three-dimensional shaped object production device according to at least one embodiment of the present invention, the ball forming means s configured to change at least one of a length of the conductive wire paid out from the leading end of the capillary, or a magnitude of a discharge current or a discharge voltage after dielectric breakdown between the leading end of the wire and the spark rod, to thereby adjust a size of the Further, the three-dimensional shaped object production device according to at least one embodiment of the present invention, further including pressurizing means for pressurizing the capillary to apply pressure to the ball at the leading end of the capillary, wherein the ball formed at the leading end of the capillary is bonded by the pressure applied by the pressurizing means.

Further, the three-dimensional shaped object production device according to at least one embodiment of the present invention, further including heating means for heating the ball at the leading end of the capillary, wherein the ball formed at the leading end of the capillary is bonded by the heating applied from the heating means.

Further, the three-dimensional shaped object production device according to at least one embodiment of the present invention, further including two or more of: ultrasonic wave application means for applying ultrasonic vibration to the capillary; pressurizing means for pressurizing the capillary to apply pressure to the ball at the leading end of the capillary; and heating means for heating the ball at the leading end of the capillary, wherein the ball formed at the leading end of the capillary is bonded through use of two or more of the ultrasonic wave application means, the pressurizing means, and the heating means.

Further, the three-dimensional shaped object production method for producing a three-dimensional shaped object according to at least one embodiment of the present invention, the three-dimensional shaped object production method includes: a ball forming step of forming a ball at a leading end of a conductive wire, which is inserted into a capillary and is paid out from a leading end of the capillary, by applying high voltage between the leading end of the conductive wire and a spark rod; a positioning step of positioning a plate, on which the three-dimensional shaped object is placeable, and the ball formed in the ball forming step by moving the plate and the ball relative to each other; and a bonding step of bonding the ball formed at the leading end of the capillary to at least one of the plate or another ball that has already been stacked on the plate, wherein the forming of the ball in the ball forming step, the positioning in the positioning step, and the bonding of the ball formed at the leading end of the capillary in the bonding step are repeated to stack the ball on the plate, to thereby produce a three-dimensional shaped object having a desired shape.

Advantageous Effects of Invention

According to at least one embodiment of the present invention, through production of the three-dimensional shaped object through use of the conductive wire, the material cost can be reduced because it is not required to use the expensive conductive powder material. It is therefore possible to inexpensively produce the three-dimensional shaped object.

Further, according to at least one embodiment of the present invention, in the production of the three-dimensional shaped object, the ball is formed at the leading end of the wire through use of an electric spark using high voltage, and the ball is welded to align and stack the formed balls. It is therefore possible to flexibly handle a wire material, which is required to be melted at high temperature, and hence a large number of types of wire can be used.

Further, according to at least one embodiment of the present invention, in the bonding of the ball formed at the leading end of the capillary and at least one of the plate or the another ball that has already been stacked on the plate, the ball formed at the leading end of the capillary and the another ball that has already been stacked on the plate are brought close to each other such that a gap is formed between the surface of the ball and the surface of the another ball, and high voltage is applied between the ball and the plate, to thereby melt and bond the ball. It is therefore possible reliably produce a three-dimensional shaped object.

Further, according to at least one embodiment of the present invention, the predetermined three-dimensional shaped object can be produced by forming the ball at the leading end of the conductive wire through use of the conductive wire and aligning and stacking the formed balls, and hence it is not required to produce a part by selectively sintering powder through use of a laser device, unlike other methods. Accordingly, through use of the conductive wire, the material that is less expensive than the conductive powder material can be used, and hence the material cost can be reduced. Further, an expensive device, for example, the laser device, is not used, and hence it is possible to inexpensively produce a three-dimensional shaped object.

Further, when the laser device is used, it is legally obliged to, for example, select a person who manages the laser device and set and manage a place at which the laser device is installed, but the present invention does not require a laser device, and hence the present invention is not subjected to those legal restrictions.

Further, according to at least one embodiment of the present invention, the ball is formed at the leading end of the conductive wire through use of the conductive wire, and the formed balls are stacked to produce the three-dimensional shaped object. The face of the three-dimensional shaped object formed by the balls has a gap except for the bonding face between the balls, and it is therefore possible to reduce the weight of the three-dimensional shaped object.

Further, in one embodiment of the present invention, unlike a method in which a metal material or the like is melted to continuously produce the three-dimensional object, the ball is formed, and the formed balls are stacked to form the three-dimensional shaped object. The present invention is therefore less likely to be restricted by the shape of a three-dimensional shaped object, and hence the present invention is excellent in flexibility of application.

Further, according to at least one embodiment of the present invention, the ball is melted and bonded by heat generated on the contact face of the ball by causing current to flow between the ball and the plate, and further, through use of any of the ultrasonic wave application means for applying ultrasonic vibration to the capillary, the pressurizing means for pressurizing the capillary to apply pressure to the ball at the leading end of the capillary, and the heating means for heating the ball at the leading end of the capillary, it is possible to more reliably bond the balls.

DESCRIPTION OF EMBODIMENTS

Figure 1:
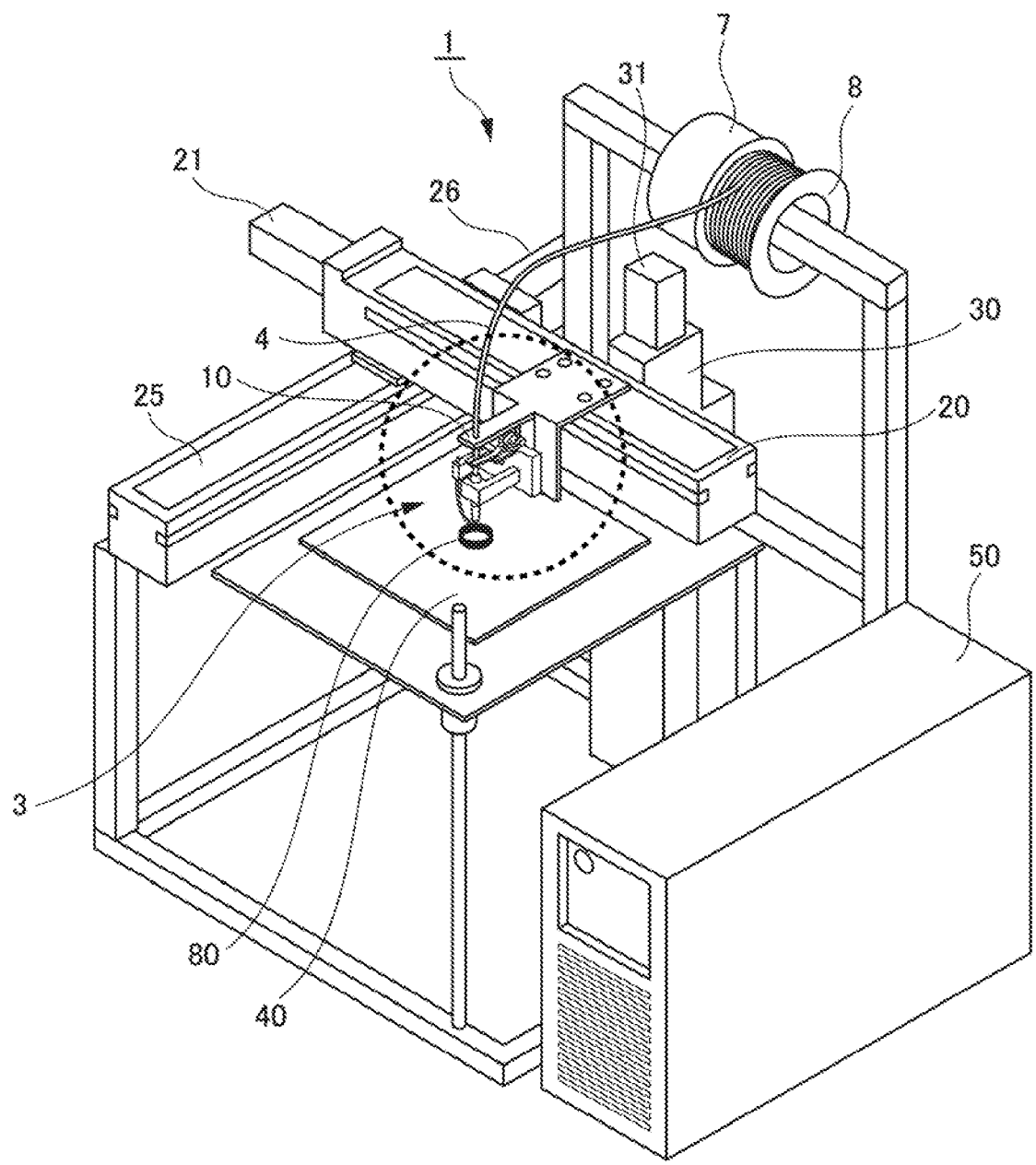
FIG. 1 is a schematic view for illustrating a configuration of a three-dimensional shaped object production deice.

Now, referring to the drawings, a three-dimensional shaped object production device and a three-dimensional shaped object production method according to embodiments of the present invention are described. In one embodiment of the present invention, a predetermined three-dimensional shaped object is produced by forming a ball at a leading end of a conductive wire made of metal or the like through use of the conductive wire, and sequentially aligning and stacking the formed balls. Through use of the conductive wire, a material that is less expensive than a conductive powder material can be used, and hence a material cost can be reduced. Further, an expensive device, for example, a laser device, is not used. It is therefore possible to inexpensively produce a three-dimensional shaped object.

[Configuration of Three-Dimensional Shaped Object Production Device]

First, a configuration of the three-dimensional shaped object production device is described with reference to FIG. 1. FIG. 1 is a schematic view for illustrating the configuration of the three-dimensional shaped object production device. As illustrated in FIG. 1, the three-dimensional shaped object production device 1 includes a head portion 3 configured to form a ball 13 (illustrated in FIG. 2) by melting a leading end of a wire 4 and to align and stack the formed balls 13, an X-axis movement device 20 serving as positioning means, which is configured to move in an X-axis direction with respect to a horizontal plane with the head portion 3 being mounted thereon, a Y-axis movement device 25 serving as the positioning means, which is configured to move in a Y-axis direction with respect to the horizontal plane with the X-axis movement device 20 being mounted thereon, and a Z-axis vertical movement device 30 serving as the positioning means, which is configured to vertically move a plate 40 having a surface arranged horizontally in a Z-axis direction with respect to the horizontal plane.

The X-axis movement device 20 includes an X-axis motor 21 having a rotational angle or position that can be controlled. The X-axis motor 21 of the X-axis movement device 20 is controlled by a control device 50, and a ball screw mechanism or a slide mechanism driven by the X-axis motor 21 moves the head portion 3 to a predetermined position in the X-axis direction.

The Y-axis movement device 25 includes a Y-axis motor 26 having a rotational angle or position that can be controlled. The Y-axis motor 26 of the Y-axis movement device 25 is controlled by the control device 50, and a ball screw mechanism or a slide mechanism driven by the Y-axis motor 26 moves the head portion 3 to a predetermined position in the Y-axis direction.

This configuration enables the head portion 3 to be moved to the predetermined position on each of the X axis and the Y axis by the X-axis movement device 20 and the Y-axis movement device 25.

As illustrated in FIG. 1, the Z-axis vertical movement device 30 includes a Z-axis motor 31 having a rotational angle that can be controlled. The Z-axis motor 31 of the Z-axis vertical movement device 30 is controlled by the control device 50, and a ball screw mechanism driven by the Z-axis motor 31 moves the plate 40 having a three-dimensional shaped object 80 placed thereon to a predetermined position in the Z-axis direction.

[Configuration of Head Portion]

Figure 2:
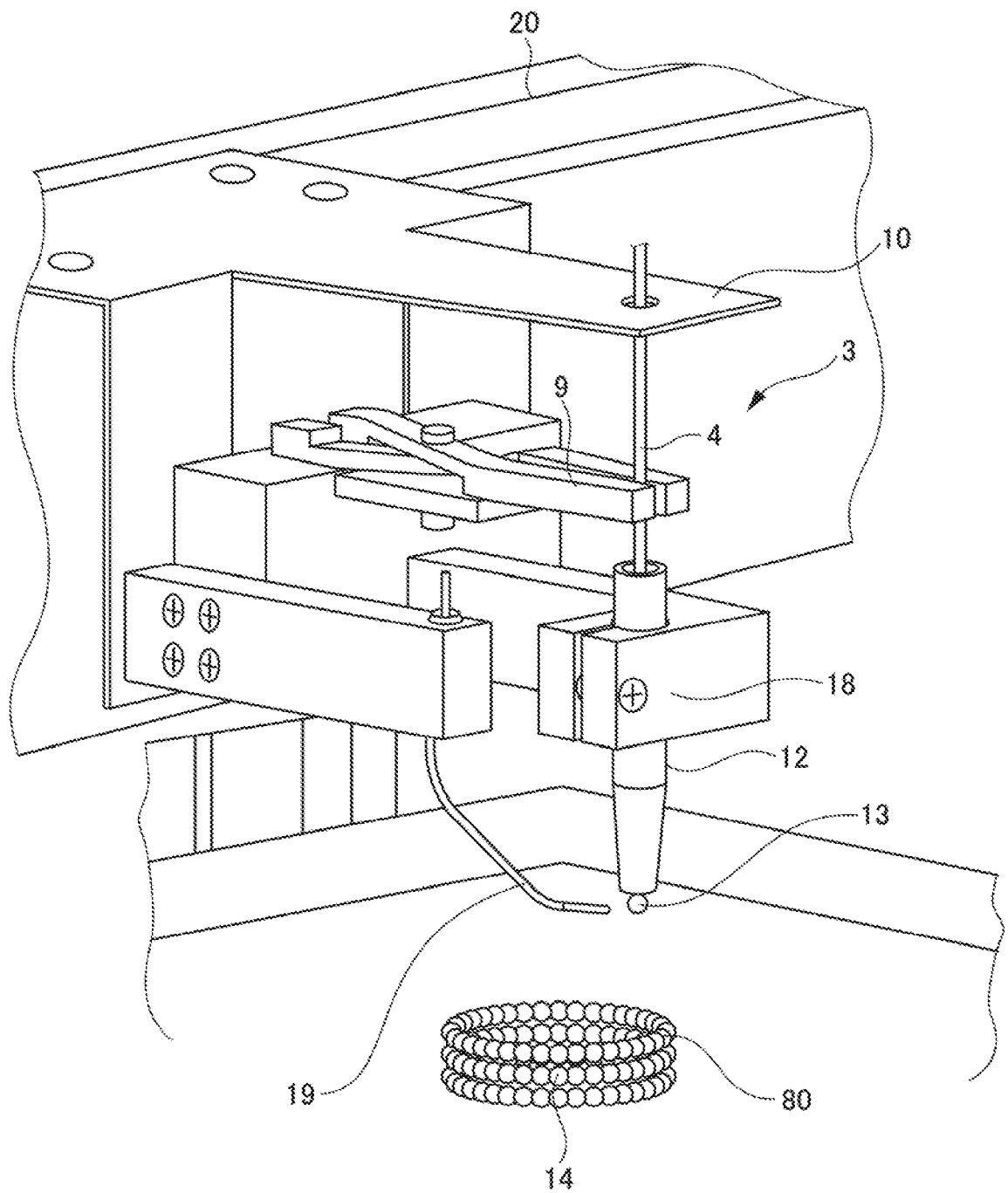
FIG. 2 is a configuration view for illustrating a configuration of a head portion in the three-dimensional shaped object production device.

Next, a configuration of the head portion in the three-dimensional shaped object production device is described with reference to FIG. 2. FIG. 2 is a configuration view for illustrating the configuration of the head portion, which is surrounded by the dotted line in the three-dimensional shaped object production device illustrated in FIG. 1.

As illustrated in FIG. 1 and FIG. 2, the head portion 3 includes a conductive wire 4 wound around a reel 8, a wire supply device 7 configured to supply the wire 4 wound around the reel 8 to a capillary 12, a wire clamp 9 configured to grasp and release the wire 4, the capillary 12 having a thin hole for allowing the wire 4 to pass therethrough in its axial center, and having a leading end with a conic shape, and a spark rod 19 configured to form the ball 13 at the leading end of the wire 4 paid out from the leading end of the capillary 12.

The wire 4 is formed of the conductive metal wire 4, and is made of, for example, iron, gold, copper, or other such material. A diameter of the wire 4 is determined based on the size of each ball 14 for forming the three-dimensional shaped object 80.

The wire supply device 7 rotates the reel 8, around which the wire 4 is wound, with a motor to pay out the wire 4 from the reel 8, to thereby supply the wire 4 to the capillary 12. A signal is issued from the control device 50 at a timing to supply the wire 4 to the capillary 12, and the motor of the wire supply device 7 rotates the reel 8 by a predetermined angle, to thereby supply the wire 4 to the capillary 12.

The wire 4 paid out from the reel 8 is guided to the wire clamp 9 via a wire guide 10 configured to guide the wire 4.

The wire clamp 9 is arranged on a path of the wire 4 between the reel 8, around which the wire 4 is wound, and the capillary 12.

The wire clamp 9 includes a mechanism configured to grasp and release the wire 4 with a solenoid or the like, and controls the solenoid, or the like included therein to grasp and release the wire 4. With the wire 4 being grasped by the wire clamp 9, the wire 4 is fixed on the wire clamp 9.

Accordingly, a position of the wire 4 that is fixed by the wire clamp 9 can be regarded as one end of the wire 4. For example, under a state in which the wire 4 is fixed by the wire clamp 9, the Z-axis vertical movement device 30 is used to draw the ball 13 welded to the another ball 14, which is located at the leading end of the capillary 12, in a downward direction via the plate 40, to thereby tear a boundary portion between the ball 13 at the leading end of the capillary 12 and the wire 4 and cut the ball 13 and the wire 4. As a result, the ball 13 at the leading end of the wire 4 is separated from the wire 4 at a neck portion of the wire 4, and the separated ball 14 is stacked onto the surface of the three-dimensional shaped object 80 being produced.

When the wire 4 is released by the wire clamp 9, the wire 4 can freely pass inside the capillary 12. For example, under a state in which the wire 4 is released by the wire clamp 9, the Z-axis vertical movement device 30 is used to draw the ball 13 at the leading end of the capillary 12 bonded to the ball 14 in the downward direction via the plate 40, to thereby be able to pay out the wire 4 from the leading end of the capillary 12.

Figure 3:
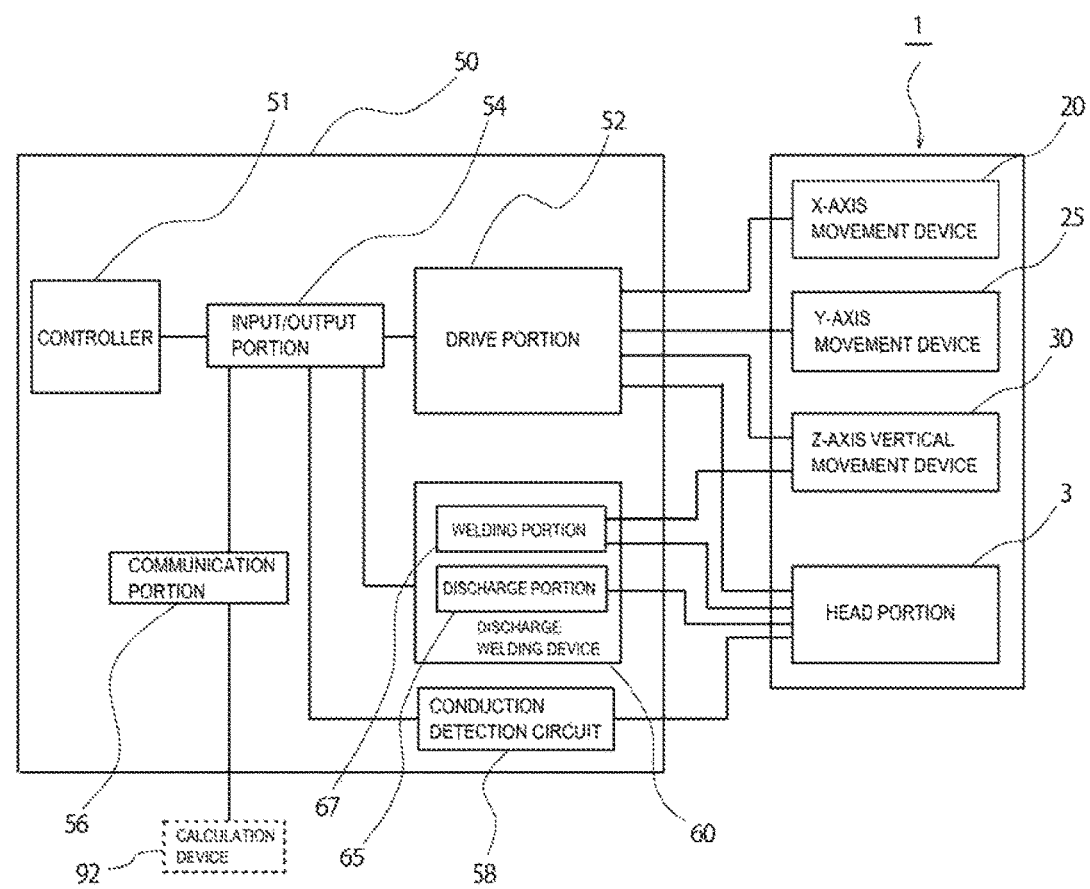
FIG. 3 is a block diagram for illustrating a configuration of a control device configured to control the three-dimensional shaped object production device.

The wire clamp 9 functions as one electrode for supplying current to the ball 13 at the leading end of the capillary 12 in a discharge portion 65 serving as ball forming means and a welding portion 67 serving as bonding means, which are included in a discharge welding device 60 (illustrated in FIG. 3). A face of the wire clamp 9 for grasping the wire 4 and a connection terminal from the discharge welding device 60 have conductivity therebetween.

That is, voltage (electric power) from a connection line from the discharge welding device 60 connected to the wire clamp 9 is fed to the face for grasping the wire 4, and the voltage from the discharge welding device 60 is supplied to the wire 4 under the state in which the wire clamp 9 is closed.

The capillary 12 is formed of an insulative material, and a part of an outer peripheral surface of the capillary 12 in the vicinity of a center of the capillary 12 in its longitudinal direction is fixed to the head portion 3 by a capillary mounting metal fitting 18.

The capillary 12 has the thin hole for allowing the wire 4 to pass therethrough in its axial center extending in the longitudinal direction, and a diameter of the hole is slightly larger than the diameter of the wire 4. The wire 4 is paid out from the leading end of the capillary 12, and the ball formed at the leading end of the wire 4 by discharge is located at the leading end of the capillary 12.

The leading end of the capillary 12 has a conic shape, in which the diameter gradually decreases toward the leading end. This is to prevent interference between a side face of the leading end of the capillary 12 and an adjacent ball 14 at the time of producing the three-dimensional shaped object 80.

The spark rod 19 has a leading end with a semispherical shape, and the spark rod 19 is mounted such that the leading end of the spark rod 19 and the leading end of the wire 4 paid out, from the leading end of the capillary 12 has a gap therebetween. High voltage is applied and discharged to a space between the wire 4 and the spark rod 19 by the discharge welding device 60, to thereby form the ball 13 for producing the three-dimensional shaped object 80 at the leading end of the wire 4.

As described above, the ball 13 is formed at the leading end of the capillary 12 by discharge energy generated by applying high voltage to the space between the wire 4 and the spark rod 19.

The late 40 of the Z-axis vertical movement device 30 has the three-dimensional shaped object 80 placed thereon, and a surface of the plate 40 or the entire plate 40 is formed of a conductive material. This enables the three-dimensional shaped object 80 using the conductive wire 4, which is placed on the surface of the plate 40, and the surface of the plate 40 to be brought into a conduction state.

The plate 40 is connected to another output terminal of the welding portion 67 of the discharge welding device 60, and functions as another electrode of the welding portion 67 in the discharge welding device 60.

[Configuration of Control Device]

Next, the control device configured to control the three-dimensional shaped object production device is described with reference to FIG. 3. FIG. 3 is a block diagram for illustrating a configuration of the control device configured to control the three-dimensional shaped object production device.

As illustrated in FIG. 3, the control device 50 has built therein a controller 51 configured to control the three-dimensional shaped object production device 1. The controller 51 includes a computer, and the computer stores, in a memory, a program for controlling the three-dimensional shaped object production device 1. The control device 50 also includes a drive portion 52 configured to drive the X-axis motor 21 of the X-axis movement device 20, the Y-axis motor 26 of the Y-axis movement device 25, and the Z-axis motor 31 of the Z-axis vertical movement device 30.

The drive portion 52 drives the solenoid of the wire clamp 9 of the head portion 3 and drives the motor of the wire supply device 7. The drive portion 52 is connected to the controller 51 via an input/output portion 54.

The computer of the controller 51 in the control device 50 executes a program to control the three-dimensional shaped object production device 1 configured to produce the three-dimensional shaped object 80.

Figure 7:
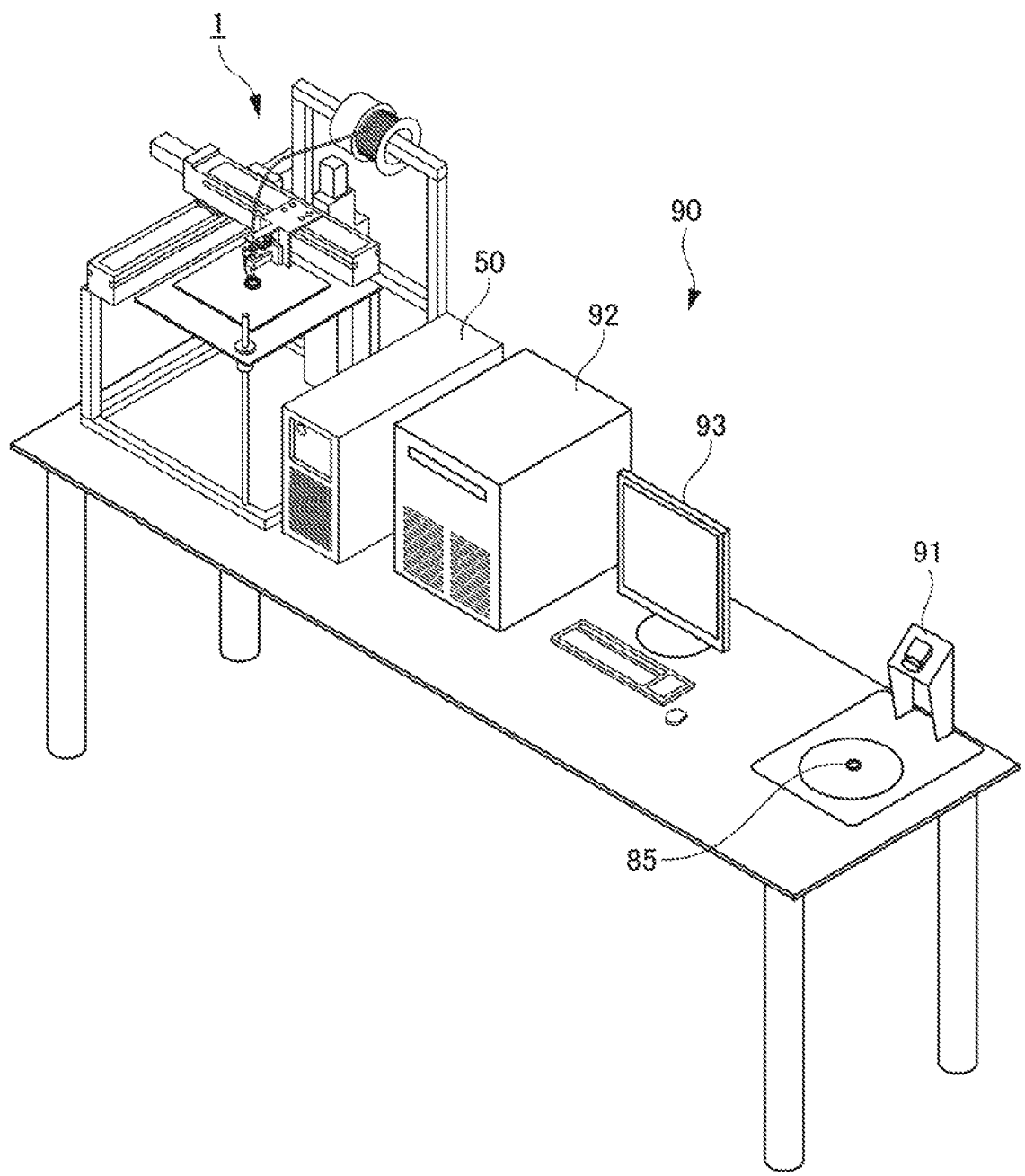
FIG. 7 is a configuration view for illustrating a configuration of a three-dimensional shaped object production system.

The control device 50 further includes a communication portion 56 configured to communicate to/from an external device, for example, a calculation device 92 illustrated in FIG. 7 and constructed of a computer, to receive data.

[Configuration of Discharge Welding Device]

The discharge welding device 60 includes the discharge portion 65 serving as the ball forming means, which is configured to apply high voltage to the space between the wire 4 and the spark rod 19, and the welding portion 67 serving as the bonding means, which is configured to bond (weld) the ball 13 at the leading end of the capillary 12 and the ball 14 that is stacked to be placed on the plate 40 and is located at the top.

The discharge portion 65 serving as the ball forming means in the discharge welding device 60 is connected to the spark rod 19 configured to apply high voltage to the space between the spark rod 19 and the wire 4. The discharge portion 65 forms the ball 13 at the leading end of the wire 4 paid out from the leading end of the capillary 12 by discharge energy generated by applying high voltage to the space between the wire 4 and the spark rod 19.

The discharge portion 65 serving as the ball forming means applies high voltage between the leading end of the conductive wire 4 paid out from the leading end of the capillary 12 and the spark rod 19, and is capable of changing a magnitude of a discharge current or a discharge voltage after dielectric breakdown between the leading end of the wire 4 and the spark rod 19. Through changing of the magnitude of the discharge current or the discharge voltage, the size of the ball 13 in the paid-out wire 4 can be adjusted.

The welding portion 67 serving as the bonding means in the discharge welding device 60 bonds the ball 13 formed at the leading end of the capillary 12 to at least one of the plate 40 or the another ball 14 already stacked on the plate 40. As a method of bonding balls by the welding portion 67, there can be adopted a gap method, in which arc welding is used while a gap s formed between balls, and a contact method, in which balls are brought into contact with each other and resistance welding using resistance heat generated by causing current to flow after the balls are brought into contact with each other is used.

The control device 50 further includes a conduction detection circuit 58 capable of detecting a conduction state between the ball 13 at the leading end of the capillary 12 and the another ball 14 that has already been stacked on the plate 40. The conduction detection circuit 58 applies low voltage to a space between the connected wire 4 and the conductive plate 40 via the wire clamp 9, to thereby detect a conduction state between the surface of the ball 13 at the leading end of the wire 4 and the surface of the ball 14 stacked on another ball.

Through use of the conduction detection circuit 58, it is possible to detect whether the ball 13 at the leading end of the capillary 12 and the another ball 14 on the plate 40 are brought into contact with each other. As a result, through determination of whether the balls 13 and 14 before being bonded by the welding portion 67 are brought into contact with each other based on a detection signal from the conduction detection circuit 58, it is possible to set a gap between the balls 13 and 14 and detect contact between the balls.

As described above, the conduction detection circuit 58 enables a positional relationship between the balls to be defined. It is therefore possible to reliably bond the balls by the welding portion 67 of the discharge welding device 60.

[Production of Three-dimensional Shaped Object]

Next, a detailed description is given of a method of producing a three-dimensional shaped object having a desired shape by the three-dimensional shaped object production device and the three-dimensional shaped object production method, by repeatedly stacking balls on the plate through bonding of a ball formed at the leading end of the capillary and another ball.

In a semiconductor device, there has been known a bonding method of forming a multi-piled bump by piling bumps to secure a required height of the bump. For example, in Japanese Patent No. 4427298 being Patent Literature 3, there is disclosed a method involving holding a metal wire by a capillary, melting the metal wire by discharge to form a ball at a leading end of the metal wire, and bonding the ball so as to pile two or more balls by applying a load and ultrasonic vibration to the ball, to thereby form a multi-piled bump.

According to Patent Literature 3, hitherto, when bumps having small diameters are piled to form a multi-piled bump, a multi-piled bump cannot be stably and securely formed by merely adjusting boding conditions.

Thus, in the method of forming a multi-piled bump disclosed in Patent Literature 3, a load applied from the capillary to a ball when the ball is bonded is set such that a load applied to an upper metal ball is smaller than that applied to a lower metal ball. Further, a power of the ultrasonic vibration applied from the capillary to a ball when the ball is bonded is set such that a power of the ultrasonic vibration applied to the upper metal ball is smaller than that applied to the lower metal ball. Further, a period of time for applying the ultrasonic vibration applied from the capillary to the ball when a ball is bonded is set such that a period of time for applying the ultrasonic vibration to the upper metal ball is shorter than that to the lower metal ball.

With the above-mentioned configuration of Patent Literature 3, when bumps are piled to form a multi-piled bump, the bumps can be reliably piled. As a result, a required height of the bump can be secured, and a multi-piled bump in which multiple bumps are stably piled can be obtained.

In one embodiment of the present invention, a three-dimensional shaped object is formed in the following manner. Specifically, the wire 4 is paid out from the leading end of the capillary 12, and the wire 4 is melted by discharge to form the ball 13 at the leading end of the wire 4. Then, the ball 13 at the leading end of the capillary 12 is welded onto the surface of the ball 14 stacked to another ball on the plate 40.

In the three-dimensional shaped object production device, the ball 13 and the plate 40 or the another ball 14 is welded through use of the gap method, which uses the arc welding, or the contact method, which uses the resistance welding. The ball 13 is formed of a conductive metal, and the plate 40 has conductivity. As a result, the balls 14 stacked on the plate 40 also have conductivity as a whole.

As described above, in the bonding of a multi-piled bump of Patent Literature 3, a ball is piled on another ball to form a bump that is tall in the vertical direction.

Figure 4:
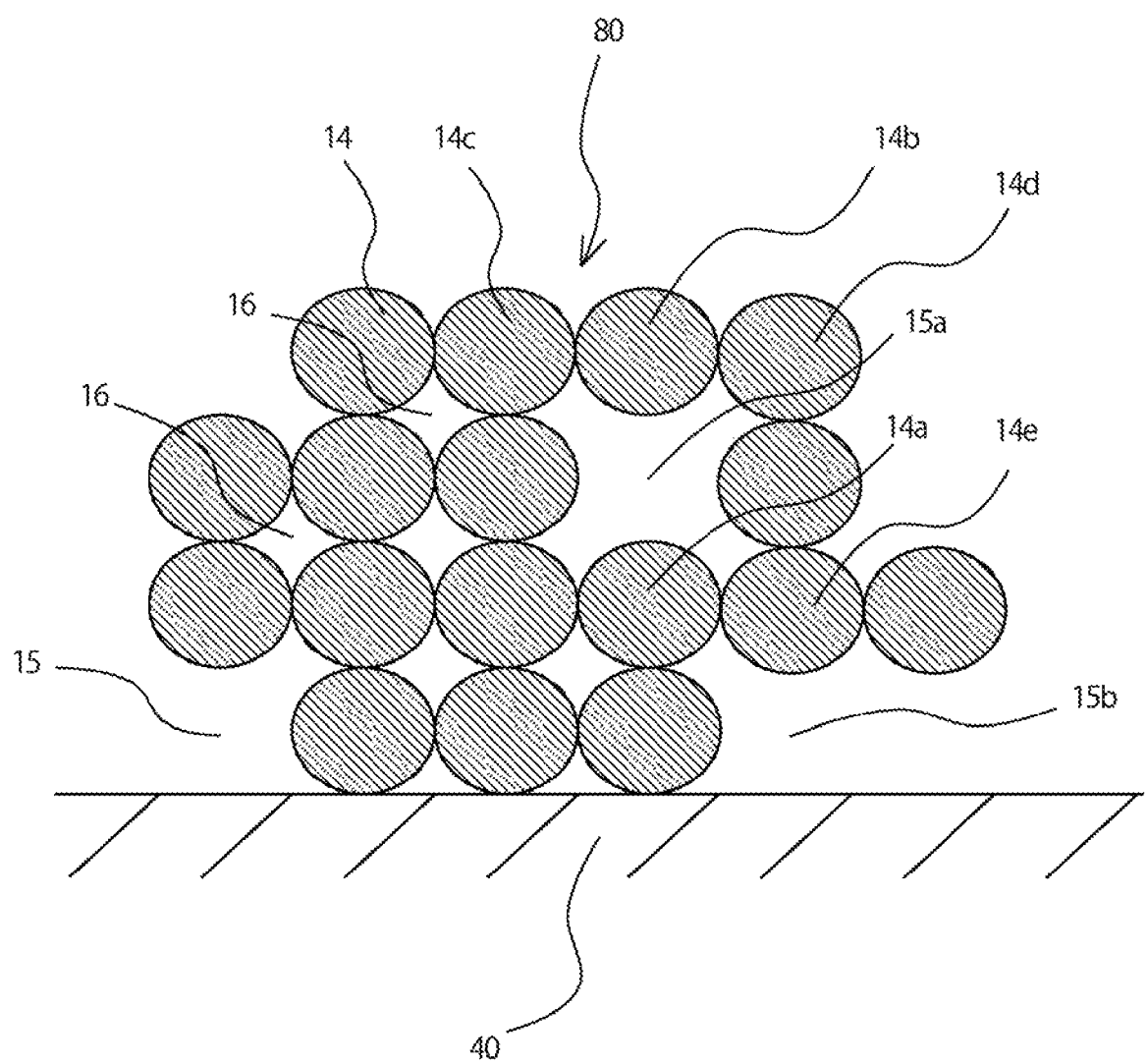
FIG. 4 is a cross-sectional view of a part of a wall face of a three-dimensional shaped object, for illustrating an example in which a space is formed on a face on which balls are stacked at a time of producing the three-dimensional shaped object.

Meanwhile, in the three-dimensional shaped object production device 1 according to at least one embodiment of the present invention, a new ball 14 can be welded not only in the vertical direction but also onto a side face of another ball 14. FIG. 4 is a cross-sectional view of a part of a wall face of a three-dimensional shaped object, for illustrating an example in which a space is formed on a face on which balls are stacked at a time of producing the three-dimensional shaped object. For example, as illustrated in FIG. 4, a space 15 can be formed when the balls are stacked. A space 15*a* illustrated in FIG. 4 is located directly above a ball 14*a*, and a ball 14*b* located above the space 15*a* is bonded to a side face of each of balls 14*c* and 14*d* located on left and right sides of the ball 14*b*. A space 15*b* is also formed between the plate 40 and a ball 14*e*.

As described above, the three-dimensional shaped object production device 1 according to at least one embodiment of the present invention is capable of welding a new ball onto the side face of the ball 14, and thus is effective also for production of a three-dimensional shaped object 80 extending in a horizontal direction, which includes a three-dimensional shaped object 80 having a cross shape, for example, and has a feature that the bonding of a multi-piled bump does not have.

As illustrated in FIG. 4, in the three-dimensional shaped object production device 1 according to at least one embodiment of the present invention, a face of the three-dimensional shaped object 80 formed by balls has a gap 16 except for a bonding face between balls, and hence the weight of the three-dimensional shaped object 80 can be reduced.

In the three-dimensional shaped object production device 1 according to at least one embodiment of the present invention, a three dimensional shaped object can be produced without forming the gap 16 between balls. For example, when the ball 13 at the leading end of the capillary 12 and the ball 14 are bonded, a small ball is formed, and pressure is applied to the ball 13 at the leading end of the capillary 12, to thereby fill the gap 16 between the balls. As another example, current may be caused to flow between the ball 13 formed at the leading end of the capillary and the plate 10 to melt the balls by heat generated on a contact face of the balls 13 and 14, to thereby fill the gap 16 between the balls.

Further, in one embodiment of the present invention, unlike the related-art bonding of a multi-piled bump for forming a multi-piled bump, balls can be stacked without application of, for example, pressure or ultrasonic wave when the balls are stacked, and hence a three-dimensional shaped object can be stably produced without a ball being flattened.

[Gap Method (Arc Welding)]

As a bonding method to be performed by the welding portion 67 serving as the bonding means in the discharge welding device 60, it is possible to adopt a gap method, in which the ball 13 paid out from the capillary 12 and the ball 14 located at the top of the three-dimensional shaped object 80 are brought close to each other to be bonded to each other, and a contact method, in which the ball 13 paid out from the capillary 12 and the ball 14 located at the top of the three-dimensional shaped object 80 are brought into contact with each other to be bonded to each other.

First, a description is given of the gap method, in which the ball 13 paid out from the capillary 12 is brought close to the ball 14 located at the top of the three-dimensional shaped object 80 to be bonded to each other. In the gap method, in bonding of the ball 13 formed at the leading end of the capillary 12 and at least one of the plate 40 or the another ball 14 that has already been stacked on the plate 40, the ball 13 formed at the leading end of the capillary 12 and the another ball 14 that has already been stacked on the plate 40 are brought close to each other such that a gap is formed between the surface of the ball 13 and the surface of the another ball 14, and high voltage is applied between the ball 13 formed at the leading end of the capillary 12 and the plate 40, to thereby melt and bond the ball 13. When high voltage is applied between the ball 13 and the plate 40, an arc having high temperature is generated to melt the ball 13.

Figure 5:
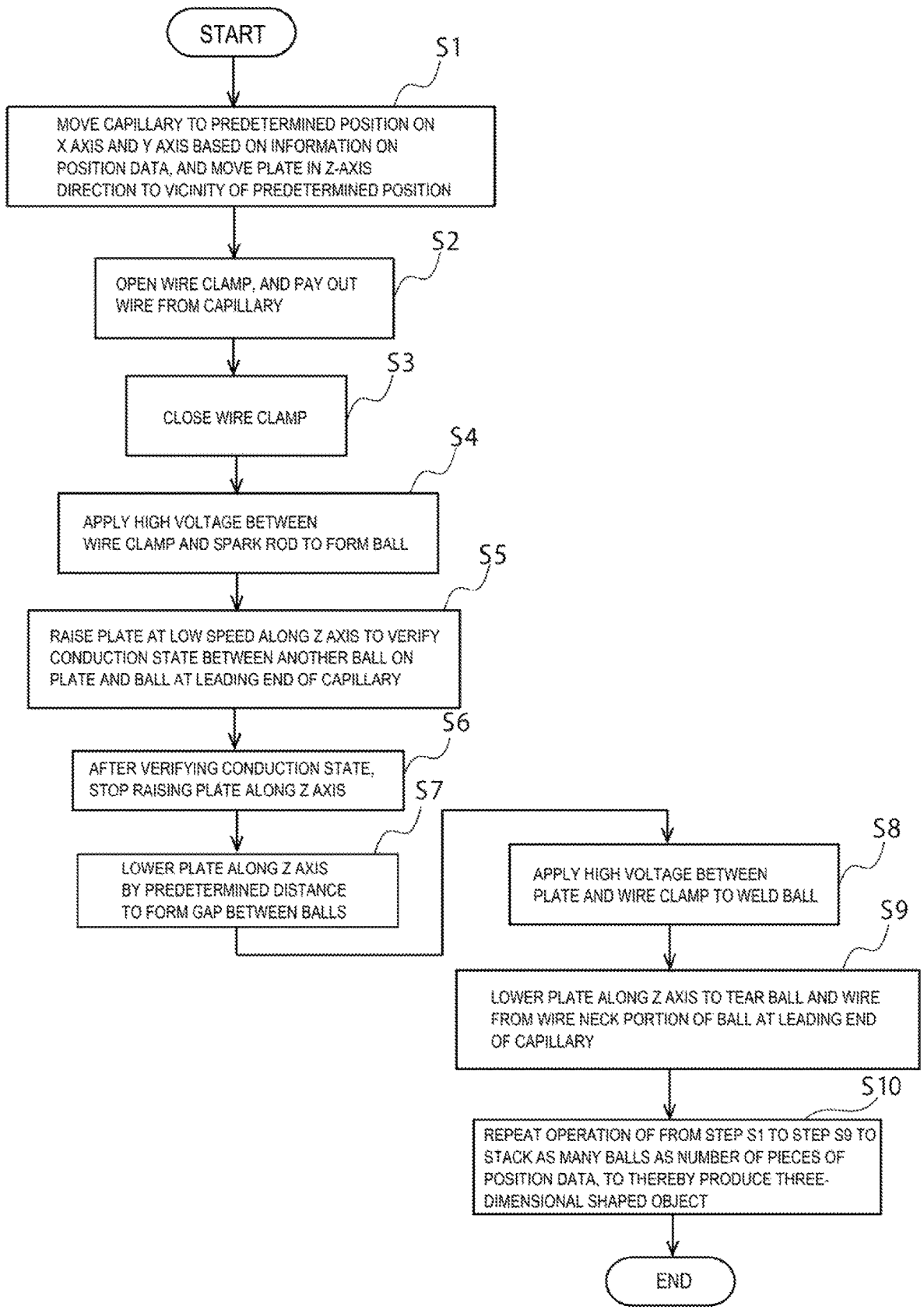
FIG. 5 is a flowchart for illustrating a process of producing a three-dimensional shaped object by the three-dimensional shaped object production device, and for illustrating a case in which high voltage is applied between a ball formed at a leading end of a capillary and a plate, to thereby melt and bond the ball.

In the following, bonding of the ball by the gap method is described with reference to a flowchart illustrated in FIG. 5. FIG. 5 is a flowchart for illustrating a process of producing a three-dimensional shaped object by the three-dimensional shaped object production device, and for illustrating a case in which high voltage is applied between the ball formed at the leading end of the capillary and the plate, to thereby melt and bond the ball.

First, the control device 50 uses, based on information on position data on a three-dimensional shaped object, the X-axis movement device 20 and the Y-axis movement device 25 to move the capillary 12 of the head portion 3 to a predetermined position on the X axis and the Y axis. The control device 50 also uses the Z-axis vertical movement device 30 to move the plate 40 in the Z-axis direction to the vicinity of the predetermined position (Step S1 illustrated in FIG. 5).

Next, the control device 50 opens the wire clamp 9, and pays out the wire 4 from the capillary 12 (Step S2). After that, the control device 50 closes the wire clamp 9 (Step S3).

After closing the wire clamp 9, the control device 50 uses the discharge portion 65 of the discharge welding device 60 to apply high voltage between the wire clamp 9 and the spark rod 19, to thereby form the hall 13 (Step S4).

Next, the control device 50 uses the Z-axis vertical movement device 30 to raise the plate 40 at low speed along the Z axis, and uses the conduction detection circuit 58 to verify a conduction state between the another ball 14 on the plate 40 and the ball 13 at the leading end of the capillary 12 (Step S5).

After verifying the conduction state, the control device 50 controls the Z-axis vertical movement device 30 to stop raising the plate 40 (Step S6).

Next, the control device 50 uses the Z-axis vertical movement device 30 to lower the plate 40 in the Z-axis direction by a predetermined distance, to thereby form a gap between the balls 13 and 14 (Step S7).

After the plate 40 is stopped, the control device 50 applies high voltage between the plate 40 and the wire clamp 9 to weld the ball 13 (Step S8). As a result, the another ball 14 on the plate 40 and the ball 13 at the leading end of the capillary 12 are bonded to each other by arc discharge. The temperature of a discharge space is increased by the arc discharge to melt the ball 13 and the another ball 14, and the ball 13 and the another ball 14 are deformed such that the balls 13 and 14 are melted toward the discharge space. Then, the balls 13 and 14 are brought into contact with each other to be bonded to each other.

Next, the control device 50 lowers the Z-axis vertical movement device 30 to tear the wire 4 from a wire neck portion of the ball 13 at the leading end of the capillary 12 (a neck portion between the ball at the leading end of the wire and the wire on the surface of the ball), to thereby separate the ball 14 and the wire 4 from each other (Step S9).

Subsequently, the control device 50 repeats the operation of from Step S1 to Step S9 to stack as many balls as the number of pieces of position data on the three-dimensional shaped object, to thereby produce the three-dimensional shaped object (Step S10).

[Contact Method (Resistance Welding)]

Meanwhile, in the contact method, in bonding of the ball 13 formed at the leading end of the capillary 12 and at least one of the plate 40 or the another ball 14 that has already been stacked on the plate 40, current is caused to flow between the ball 13 formed at the leading end of the capillary 12 and the plate 40 under a state in which the surface of the ball 13 formed at the leading end of the capillary 12 is brought into contact with the surface of the another ball 14 that has already been stacked on the plate 40, to thereby melt and bond the ball 13 by heat generated on the contact face between the ball 13 and the another ball 14. The contact face between the ball 13 and the another ball 14 has resistance on a current path, and heat is generated by the current due to the resistance. Then, the ball 13 is bonded by the generated heat.

Figure 6:
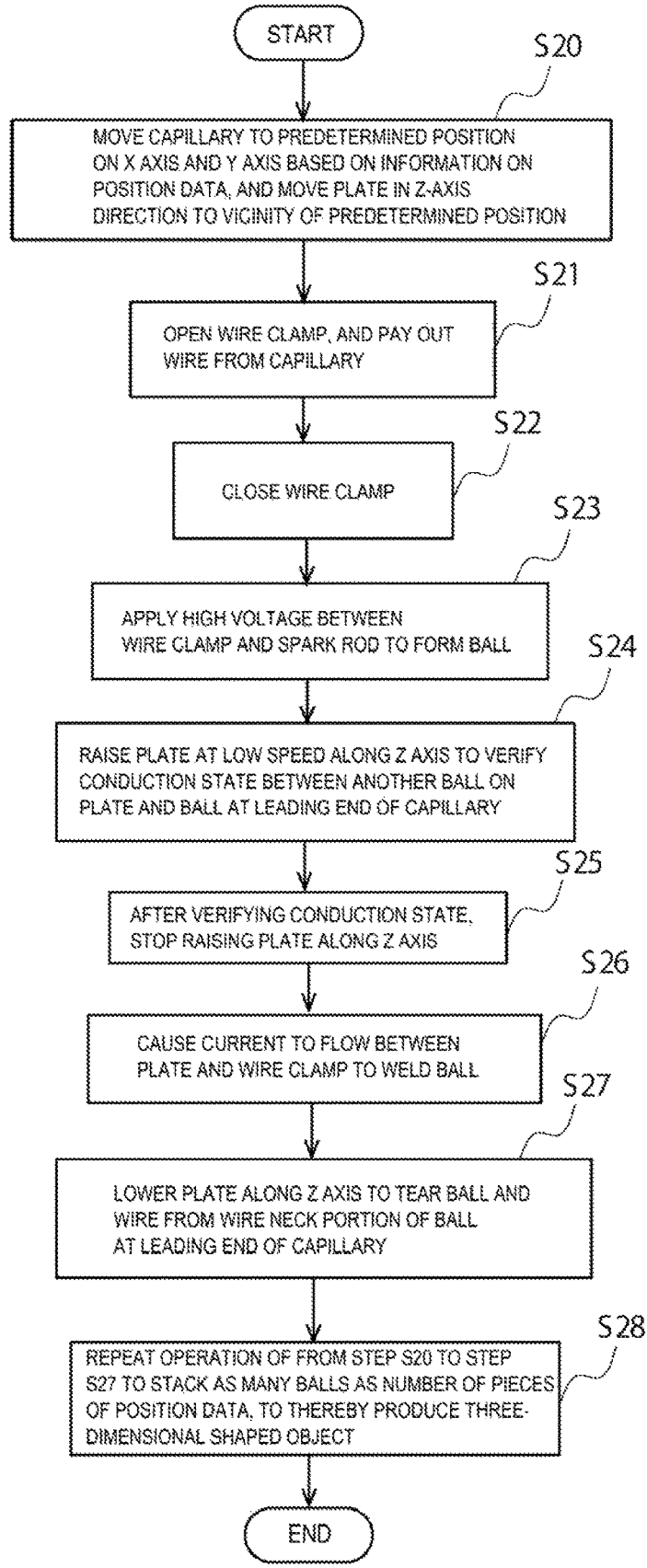
FIG. 6 is a flowchart for illustrating a process of producing a three-dimensional shaped object by the three-dimensional shaped object production device, and for illustrating a case in which current is caused to flow between the ball and the plate under a state in which a surface of the ball formed at the leading end of the capillary and a surface of another ball that has already been stacked on the plate are brought into contact with each other, to thereby melt and bond the ball.

In the following, bonding of the ball by the contact method is described with reference to a flowchart illustrated in FIG. 6. FIG. 6 is a flowchart for illustrating a process of producing a three-dimensional shaped object by the three-dimensional shaped object production device, and for illustrating a case in which current is caused to flow between the ball and the plate under a state in which the surface of the ball formed at the leading end of the capillary and the surface of the another ball that has already been stacked on the plate are brought into contact with each other, to thereby melt and bond the ball.

First, the control device 50 uses, based on information on position data on a three-dimensional shaped object, the X-axis movement device 20 and the Y-axis movement device 25 to move the capillary 12 of the head portion 3 to a predetermined position on the X axis and the Y axis. The control device 50 also uses the Z-axis vertical movement device 30 to move the plate 40 in the Z-axis direction to the vicinity of the predetermined position (Step S20 illustrated in FIG. 6).

Next, the control device 50 opens the wire clamp 9, and pays out the wire 4 from the capillary 12 (Step S21). After that, the control device 50 closes the wire clamp 9 (Step S22).

After closing the wire clamp 9, the control device 50 uses the discharge portion 65 of the discharge welding device 60 to apply high voltage between the wire clamp 9 and the spark rod. 19, to thereby form the ball 13 (Step S23).

Next, the control device 50 uses the Z-axis vertical movement device 30 to raise the plate 40 at low speed along the Z axis, and uses the conduction detection circuit 58 to verify a conduction state between the another ball 14 on the plate 40 and the ball 13 at the leading end of the capillary 12 (Step S24).

After verifying the conduction state, the control device 50 controls the Z-axis vertical movement device 30 to stop raising the plate 40 (Step S25).

Next, under a state in which the surface of the ball 13 formed at the leading end of the capillary 12 is brought into contact with the surface of the another ball 14 that has already been stacked on the plate 40, the control device 50 causes current to flow between the ball 13 and the plate 40. Heat is generated on the contact face of the balls by causing the current to flow, and the ball is thus melted (Step S26). As a result, the another ball 14 on the plate 40 and the ball 13 at the leading end of the capillary 12 are bonded to each other.

Next, the control device 50 lowers the Z-axis vertical movement device 30 to tear the ball 13 and the wire from the wire neck portion of the ball 13 at the leading end of the capillary 12, to thereby separate the ball 14 and the wire 4 from each other (Step S27).

The control device 50 repeats the operation of from Step S20 to Step S27 to stack as many balls as the number of pieces of position data on the three-dimensional shaped object, to thereby produce the three-dimensional shaped object (Step S28).

As described above, as the bonding method to be performed by the welding portion 67 of the discharge welding device 60, it is possible to adopt the gap method, in which the ball 13 paid out from the capillary 12 and the ball 14 stacked on another ball and located at the top of the three-dimensional shaped object 80 are brought close to each other to be bonded to each other, and the contact method, in which the ball paid out from the capillary 12 and the ball 14 stacked or another ball and located at the top of the three-dimensional shaped object 80 are brought into contact with each other to be bonded to each other.

[Production of Three-dimensional Shaped Object by Ultrasonic Vibration or the Like]

In the three-dimensional shaped object production device according to at least one embodiment of the present invention, when a balls stacked onto another ball by bonding those balls, ultrasonic vibration, pressure, heat, or the like may be applied as a bonding condition. The application of ultrasonic vibration, pressure, heat, or the like may be combined with the contact method (resistance welding).

For example, the three-dimensional shaped object production device 1 includes ultrasonic wave application means for applying ultrasonic vibration to the capillary 12, and bonding of the ball 13 formed at the leading end of the capillary 12 and at least one of the plate 40 or the another ball 14 that has already been stacked on the plate 40 is performed through use of the ultrasonic vibration applied from the ultrasonic wave application means. As the ultrasonic wave application means, the capillary mounting metal fitting 18 includes an ultrasonic horn and an ultrasonic vibrator (not shown), and the capillary 12 is attached to the vicinity of a leading end of the ultrasonic horn.

[Vibration Direction of Ultrasonic Wave]

The ultrasonic vibration is applied in a direction along a plane that crosses a line connecting the center of the ball 13 formed at the leading end of the capillary 12 and the center of the another ball 14 that has already been stacked on the plate 40. This enables the ultrasonic vibration to be effectively applied to the ball, to thereby facilitate bonding. The ultrasonic vibration may be applied in a direction along a plane that is orthogonal to the line connecting the center of the ball 13 and the center of the another ball 14. In this case, the ultrasonic vibration is applied more effectively.

The three-dimensional shaped object production device 1 includes pressurizing means for pressurizing the capillary 12 to apply pressure to the ball 13 at the leading end of the capillary 12. Bonding of the ball 13 formed at the leading end of the capillary 12 and at least one of the plate 40 or the another ball 14 that has already been stacked on the plate 40 is performed through use of the pressure applied from the pressurizing means.

As the pressurizing means, for example, a fulcrum is provided in the vicinity of a center in a longitudinal direction of an arm of the head portion 3 to which the capillary 12 is mounted, and a pressurizing mechanism is arranged in the vicinity of an end of the arm opposed to the capillary 12 so that the capillary generates pressure in a downward direction. In this manner, pressure is applied by the pressurizing mechanism while a ball and another ball are being bonded. Bonding that uses the pressurizing means is used in combination with at least one of the contact method (resistance welding), application of ultrasonic waves, or heating of the ball 13 at the leading end of the capillary 12, because bonding by only the application of pressure is difficult.

The three-dimensional shaped object production device 1 includes heating means for heating the ball 13 formed at the leading end of the capillary 12. Bonding of the ball 13 formed at the leading end of the capillary 12 and at least one of the plate 40 or the another ball 14 that has already been stacked on the plate 40 is performed through use of the heat applied from the heating means.

For example, a heater is arranged in the vicinity of the leading end of the capillary 12, and the ball is heated by the heater. When the ball is heated, the ball is softened and becomes easier to be deformed, and hence bonding is facilitated.

The three-dimensional shaped object production device 1 includes two or more of the ultrasonic wave application means for applying ultrasonic vibration to the capillary 12, the pressurizing means for pressuring the capillary 12 to apply pressure to the ball 13 at the leading end of the capillary 12, and the heating means for heating the ball 13 at the leading end of the capillary 12, and bonding of the ball 13 formed at the leading end of the capillary 12 and at least one of the plate 40 or the another ball 14 that has already been stacked on the plate 40 is performed through use of two or more of the ultrasonic wave application means, the pressurizing means, and the heating means.

In the resistance welding, in which the ball 13 is melted and bonded by heat generated on the contact face of the ball 13 through application of current between the ball 13 and the plate 40, at least one of application of pressure to the bonding face or application of ultrasonic vibration may be used in combination.

[Configuration of Three-dimensional Shaped Object Production System]

Next, a configuration of a three-dimensional shaped object production system that uses the three-dimensional shaped object production device is described with reference to FIG. 7. FIG. 7 is a configuration diagram for illustrating the configuration of the three-dimensional shaped object production system.

As illustrated in FIG. 7, a three-dimensional shaped object production system 90 includes a three-dimensional reading device (three-dimensional scanner) 91, a calculation device 92 constructed of a computer, a display device 93, the three-dimensional shaped object production device 1, and the control device 50 configured to control the three-dimensional shaped object production device 1.

The three-dimensional reading device 91 scans an entire solid object 85 to be produced by a scanner configured to use light or the like, to output measured three-dimensional data.

The calculation device 92 constructed of the computer is a device configured to receive the three-dimensional data from the three-dimensional reading device 91 and convert the three-dimensional data into machine-controllable data. The calculation device 92 includes the display device 93 configured to display data and display a state of the device. The display device 93 also functions as an input device to be used to input character data or the like.

The machine-controllable data obtained by conversion is output from the calculation device 92 to the control device 50 to be used as data for controlling the three-dimensional shaped object production device 1.

[Production of Three-Dimensional Shaped Object]

Figure 8:
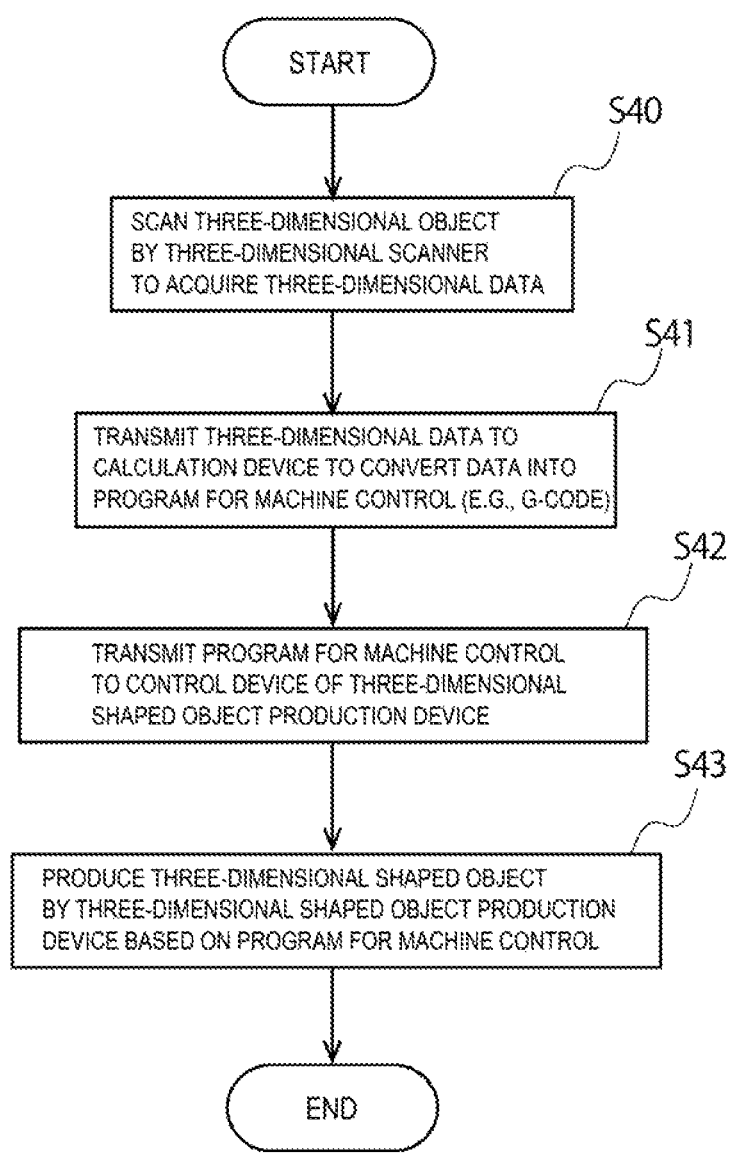
FIG. 8 is a flowchart for illustrating an outline of a process to be performed until a three-dimensional shaped object is produced in the three-dimensional shaped object production system.

Next, an outline of a process to be performed until a three-dimensional shaped object is produced in the three-dimensional shaped object production system is described with reference to FIG. 8. FIG. 8 is a flowchart for illustrating the outline of the process to be performed until a three-dimensional shaped object is produced in the three-dimensional shaped object production system.

First, an entire object to be produced is scanned by the three-dimensional reading device 91, for example, a scanner, to read three-dimensional information on the object (Step S40 illustrated in FIG. 8).

Next, the data read by the three-dimensional reading device 91 is output to the calculation device 92, and the calculation device 92 converts the data into a data format that can be read in three-dimensional CAD data or the like (Step S41).

It is to be understood that, in place of the data from the three-dimensional reading device 91, data obtained by designing an object to be produced through use of three-dimensional CAD or the like may also be used.

In this manner, the three-dimensional CAD data is converted into machine-controllable data by the calculation device 92 constructed of the computer. As the machine-controllable data, G-code being a program for machine control is known, for example.

The machine-controllable data obtained by conversion is stored into a storage medium, or is transmitted to the control device 50 by communication means. The control device 50 stores the received data into a storage device (Step S42).

The control device 50 reads out the stored data, and controls the X-axis movement device 20, the Y-axis movement device 25, the Z-axis vertical movement device 30, the head portion 3, and the like, to thereby produce the three-dimensional shaped object 80 (Step S43).

In the manner described above, through use of the three-dimensional reading device, for example, the scanner to read coordinate data, which is information on a position, on an entire object to be produced by the three-dimensional shaped object production system, a process to be performed until the three-dimensional shaped object is produced by the three-dimensional shaped object production device can be performed in a short period of time.

As described above, according to at least one embodiment of the present invention, through production of a three-dimensional shaped object through use of the conductive wire, a material cost can be reduced because it is not required to use an expensive conductive powder material. It is therefore possible to inexpensively produce a three-dimensional shaped object.

Further, according to at least one embodiment of the present invention, in the production of a three-dimensional shaped object, a ball is formed at the leading end of the wire through use of an electric spark using high voltage, and the ball is welded to align and stack the formed balls. It is therefore possible to flexibly handle a wire material, which is required to be melted at high temperature, and hence a large number of types of wire can be used.

Further, according to at least one embodiment of the present invention, in the bonding of the ball formed at the leading end of the capillary and at least one of the plate or the another ball that has already been stacked on the plate, the ball formed at the leading end of the capillary and the another ball that has already been stacked on the plate are brought close to each other such that a gap is formed between the surface of the ball and the surface of the another ball, and high voltage is applied between the ball and the plate, to thereby melt and bond the ball. It is therefore possible reliably produce a three-dimensional shaped object.

Further, according to at least one embodiment of the present invention, the predetermined three-dimensional shaped object can be produced by forming the ball at the leading end of the conductive wire through use of the conductive wire and aligning and stacking the formed balls, and hence it is not required to produce a part by selectively sintering powder through use of a laser device, unlike other methods. Accordingly, through use of the conductive wire, material that is less expensive than a conductive powder material can be used, and hence the material cost can be reduced. Further, an expensive device, for example, the laser device, is not used, and hence it is possible to inexpensively produce a three-dimensional shaped object.

Further, when a laser device is used, it is legally obliged to, for example, select a person who manages the laser device and set and manage a place at which the laser device is installed, but the present invention does not require a laser device, and hence the present invention is not subjected to those legal restrictions.

Further, according to at least one embodiment of the present invention, a ball formed at the leading end of the conductive wire through use of the conductive wire, and the formed balls are stacked to produce a three-dimensional shaped object The face of the three-dimensional shaped object formed by the balls has a gap except for the bonding face between the balls, and it is therefore possible to reduce the weight of the three-dimensional shaped object.

Further, in one embodiment of the present invention, unlike a method in which a metal material or the like is melted to continuously produce a three-dimensional object, a ball is formed, and the formed balls are stacked to form a three-dimensional shaped object. The present invention is therefore less likely to be restricted by the shape of a three-dimensional shaped object, and hence the present, invention is excellent in flexibility of application.

Further, according to at least one embodiment of the present invention, a ball s melted and bonded by heat generated on the contact face of the ball by causing current to flow between the ball and the plate, and further, through use of any of the ultrasonic wave application means for applying ultrasonic vibration to the capillary, the pressurizing means for pressurizing the capillary to apply pressure to the ball at the leading end of the capillary, and the heating means for heating the ball at the leading end of the capillary, it is possible to reliably bond the balls.

Further, through use of the three-dimensional reading device, for example, the scanner, to read coordinate data, which is information on a position, on an entire object to be produced by the three-dimensional shaped object production system, a process to be performed until a three-dimensional shaped object is produced by the three-dimensional shaped object production device according to at least one embodiment of the present invention can be performed in a short period of time.

The present invention can be embodied in a large number of forms without departing from the essential characteristics thereof. Thus, the above-mentioned embodiment is exclusive for description, and it is to be understood that the present invention is not limited to the above-mentioned embodiment.

REFERENCE SIGNS LIST 1 three-dimensional shaped object production device
3 head portion.
4 wire
7 wire supply device
8 reel
9 wire clamp
10 wire guide
12 capillary
13 ball (leading end of capillary)
14, 14a, 14b, 14c, 14d, 14e ball (stacked on plate)
15, 15a, 15b space
16 gap
18 capillary mounting metal fitting
19 spark rod
20 X-axis movement device (positioning means)
21 X-axis motor
25 Y-axis movement device (positioning means)
26 Y-axis motor
30 Z-axis vertical movement device (positioning means)
31 Z-axis motor
40 plate (conductive plate)
50 control device
51 controller
52 drive portion
54 input/output portion
56 communication portion
58 conduction detection circuit
60 discharge welding device
65 discharge portion (ball forming means)
67 welding portion (bonding means)
80 three-dimensional shaped object
85 solid object
90 three-dimensional shaped object production system
91 three-dimensional reading device (three-dimensional scanner)
92 calculation device (computer)
93 display device

What is claimed is:

1. A three-dimensional shaped object production device, which is configured to produce a three-dimensional shaped object,
the three-dimensional shaped object production device comprising:
a plate, on which the three-dimensional shaped object is placeable, at least a surface of the plate being formed of a conductive material;
a ball forming section configured to form a ball at a leading end of a conductive wire, which is inserted into a capillary and is paid out from a leading end of the capillary, by applying high voltage between the leading end of the conductive wire and a spark rod;

a positioning device configured to position the plate and the ball forming section by moving the plate and the ball forming section relative to each other; and a bonding section configured to bond the ball formed at the leading end of the capillary to at least one of the plate or another ball that has already been stacked on the plate by applying high voltage between the ball formed at the leading end of the capillary and the plate, wherein the forming of the ball by the ball forming section, the positioning by the positioning device, and the bonding of the ball formed at the leading end of the capillary by the bonding section are repeated to stack the ball on the plate, to thereby produce a three-dimensional shaped object having a desired shape.

2. The three-dimensional shaped object production device according to claim 1, wherein the ball formed at the leading end of the capillary is bonded by applying high voltage between the ball formed at the leading end of the capillary and the plate under a state in which a surface of the ball formed at the leading end of the capillary and a surface of the another ball that has already been stacked on the plate are brought close to each other so as to have a gap therebetween.

3. The three-dimensional shaped object production device according to claim 1, wherein the ball formed at the leading end of the capillary is bonded by causing current to flow between the ball formed at the leading end of the capillary and the plate under a state in which a surface of the ball formed at the leading end of the capillary and a surface of the another ball that has already been stacked on the plate are brought into contact with each other.

4. The three-dimensional shaped object production device according to claim 3, further comprising an ultrasonic wave application section configured to apply ultrasonic vibration to the capillary, wherein the ball formed at the leading end of the capillary is bonded by the ultrasonic vibration applied by the ultrasonic wave application section, in combination with the high voltage applied between the ball formed at the leading end of the capillary and the plate.

5. The three-dimensional shaped object production device according to claim 4, wherein the ultrasonic vibration is applied to the ball formed at the leading end of the capillary in a direction along a plane that crosses a line connecting a center of the ball formed at the leading end of the capillary and a center of the another ball that has already been stacked on the plate.

6. The three-dimensional shaped object production device according to claim 1, wherein the ball forming section is configured to change at least one of a length of the conductive wire paid out from the leading end of the capillary, or a magnitude of a discharge current or a discharge voltage after dielectric breakdown between the leading end of the conductive wire and the spark rod, to thereby adjust a size of the ball.

7. The three-dimensional shaped object production device according to claim 3, further comprising a pressurizing part configured to pressurize the capillary to apply pressure to the ball at the leading end of the capillary, wherein the ball formed at the leading end of the capillary is bonded by the pressure applied by the pressurizing part, in combination with the high voltage applied between the ball formed at the leading end of the capillary and the plate.

8. The three-dimensional shaped object production device according to claim 3, further comprising a heater configured to heat the ball at the leading end of the capillary, wherein the ball formed at the leading end of the capillary is bonded by the heating applied from the heater, in combination with the high voltage applied between the ball formed at the leading end of the capillary and the plate.

9. The three-dimensional shaped object production device according to claim 3, further comprising two or more of:

an ultrasonic wave application section configured to apply ultrasonic vibration to the capillary;

a pressurizing part configured to pressurize the capillary to apply pressure to the ball at the leading end of the capillary; and a heater configured to heat the ball at the leading end of the capillary, wherein the ball formed at the leading end of the capillary is bonded through use of two or more of the ultrasonic wave application section, the pressurizing part, and the heater, in combination with the high voltage applied between the ball formed at the leading end of the capillary and the plate.

* * * * *